United States Patent [19]

Henderson

[11] Patent Number: 5,098,203
[45] Date of Patent: Mar. 24, 1992

[54] BEARING SYSTEM

[75] Inventor: David A. Henderson, Monroeville, Pa.

[73] Assignee: Contraves Goerz Corporation, Pittsburgh, Pa.

[21] Appl. No.: 667,562

[22] Filed: Mar. 11, 1991

[51] Int. Cl.$^5$ .............................................. F16C 32/06
[52] U.S. Cl. ...................................... 384/12; 384/446; 384/100; 384/124; 384/912
[58] Field of Search ................... 384/12, 446, 100, 912, 384/124, 119

[56] References Cited

U.S. PATENT DOCUMENTS

| 4,726,689 | 2/1988 | Pollock | 384/12 |
| 4,898,480 | 2/1990 | Raj et al. | 384/446 |
| 4,984,909 | 1/1991 | Shirotori | 384/446 |
| 5,010,794 | 4/1991 | Klager | 384/12 |

Primary Examiner—Lenard A. Footland
Attorney, Agent, or Firm—Ansel M. Schwartz

[57] ABSTRACT

A bearing system comprised of a base made of a magnetic material. The bearing system is also comprised of an element disposed adjacent the base. The element is comprised of a device for creating a separation force and a positive stiffness between the element and the base such that a gap is formed therebetween. The element is also comprised of a device for generating magnetic flux such that a closed magnetic flux circuit is formed through the element, the base and the gap creating a preload force and a negative stiffness between the element and the base. The positive stiffness is greater than a negative stiffness, and the preload force essentially balances the separation force. In a preferred embodiment, the creating device includes a device for flowing fluid through the element such that a fluid pressure is formed between the element and the base, resulting in the presence of the gap and the positive stiffness.

14 Claims, 4 Drawing Sheets

BEARING SYSTEM

FIELD OF THE INVENTION

The present invention is related to bearings. In particular, the present invention is related to a fluid film bearing having a magnetic preload force.

BACKGROUND OF THE INVENTION

The technology of fluid film bearings is well established and used in many industries including aerospace, electronic semiconducting manufacturing, optics, machine tools and electrical power generation. Fluid film bearings typically use air or oil to create a frictionless separation force between two elements in motion relative to each other. The pressure of the fluid between the elements creates a separating force that creates a gap between the elements.

The gap filled with pressurized fluid acts like a positive stiffness spring, increasing its separation force, as the elements are forced together, for instance, by an outside disturbance. Unfortunately, the pressurized fluid cannot hold the element together if an outside force pulls the elements apart. Therefore, many fluid bearings comprise means to supply a preload force which acts to resist the separation of the elements. Preloading is typically accomplished by adding mass to one of the elements to supply a constant preload force which acts to force the element together. Unfortunately, the added mass also increases the inertia of the bearing which limits its dynamic response. Vacuum preloading, wherein a portion of the elements are pulled together by vacuum, can also be used to create a preload force. Vacuum systems offer only limited effectiveness and are unduly complicated. Preloading is also accomplished by using opposing fluid surfaces linked together by supporting structure. The present invention creates preload force by creating a magnetic force through the elements which acts to pull the elements together and increase dynamic response.

SUMMARY OF THE INVENTION

The present invention pertains to a bearing system. The bearing system is comprised of a base made of a magnetic material. The bearing system is also comprised of an element disposed adjacent the base. The element is comprised of means for creating a separation force with a positive stiffness between the element and the base such that a gap is formed therebetween. The element is also comprised of means for generating magnetic flux such that a closed magnetic flux circuit is formed through the element, the base and the gap creating a preload force with a negative stiffness between the element and the base. The positive stiffness is greater than a negative stiffness, and the preload force essentially balances separation force.

In a preferred embodiment, the creating means includes means for flowing fluid through the element such that a fluid pressure is formed between the element and the base, resulting in the presence of the separation force and the positive stiffness.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
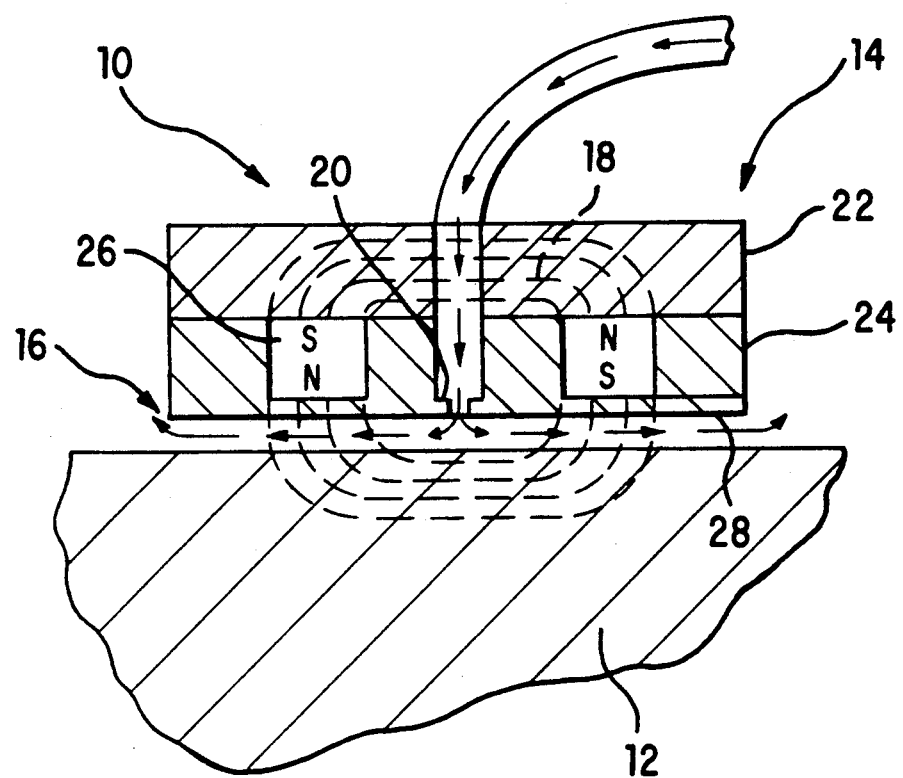
FIG. 1 is a schematic representation of a cross-sectional view of a bearing system.

Referring now to the drawings wherein like reference numerals refer to similar or identical parts throughout the several views, and more specifically to FIG. 1 thereof, there is shown a schematic representation of a cross-sectional view of a bearing system 10. The bearing system 10 is comprised of a base 12 made of a magnetic material. The bearing system 10 is also comprised of an element 14 disposed adjacent the base 12. The element 14 is comprised of means for creating a separation force with positive stiffness between the element 14 and the base 12 such that a gap 16 is formed therebetween. The element 14 is also comprised of means for generating magnetic flux such that a closed magnetic flux circuit 18 is formed through the element 14, the base 12 and the gap 16 creating a preload force with negative stiffness between the element 14 and the base 12. The positive stiffness is greater than the negative stiffness, and the preload force essentially balances the separation force.

Preferably, the creating means includes means for flowing fluid through the element 14 such that a fluid pressure is formed between the element 14 and the base 12 resulting in the presence of the separation force and the positive stiffness. The system 10 can include a fluid supply means and the flowing means can preferably include at least one fluid channel 20 extending through the element 14 and fluidically connected to the fluid supply means. The fluid supply means can include a reservoir (not shown) and a pump fluidically connected to the reservoir and the flow channel 20. If air is used, then the pump can just draw air from the atmosphere and no reservoir is needed.

The element 14 preferably includes a backplate 22 made of a magnetic material and a centerplate 24 made of a nonmagnetic material in contact with the backplate 22 such that the centerplate 24 is between the backplate 22 and the base 12. The channel 20 preferably extends through the centerplate 24 and the backplate 22.

The magnetic flux 18 generating means preferably includes magnets 26 with an equal number of north and south poles of equivalent size and field strength. Magnets 26 are preferably disposed in the centerplate 24 such that the polarity of adjacent magnets 26 in the centerplate 24 alternate so the closed flux circuit 18 is formed through the adjacent magnets 26, the backplate 22, the gap 16 and the base 12. Preferably, the magnets 26 are recessed from the surface 28 of the centerplate 24 in contact with the gap 16. As shown in FIG. 1, the number of magnets 26 equals 2.

The magnets 26 can be electromagnets or permanent magnets. Of the permanent magnets, preferably, the magnets 26 are rare earth magnets 26 which, can be made for instance of Nd-Fe-B.

Figure 2:
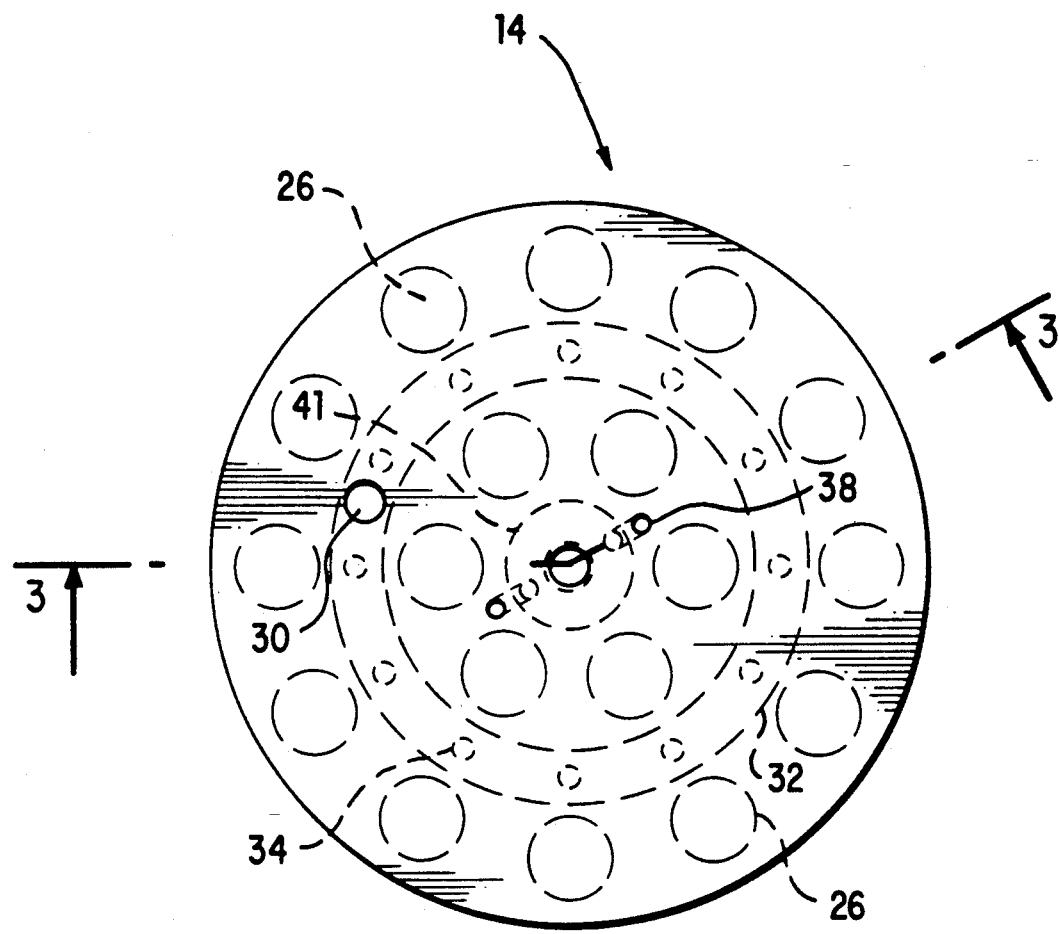
FIG. 2 is an elevation view of a preferred embodiment of a bearing system.
Figure 3:
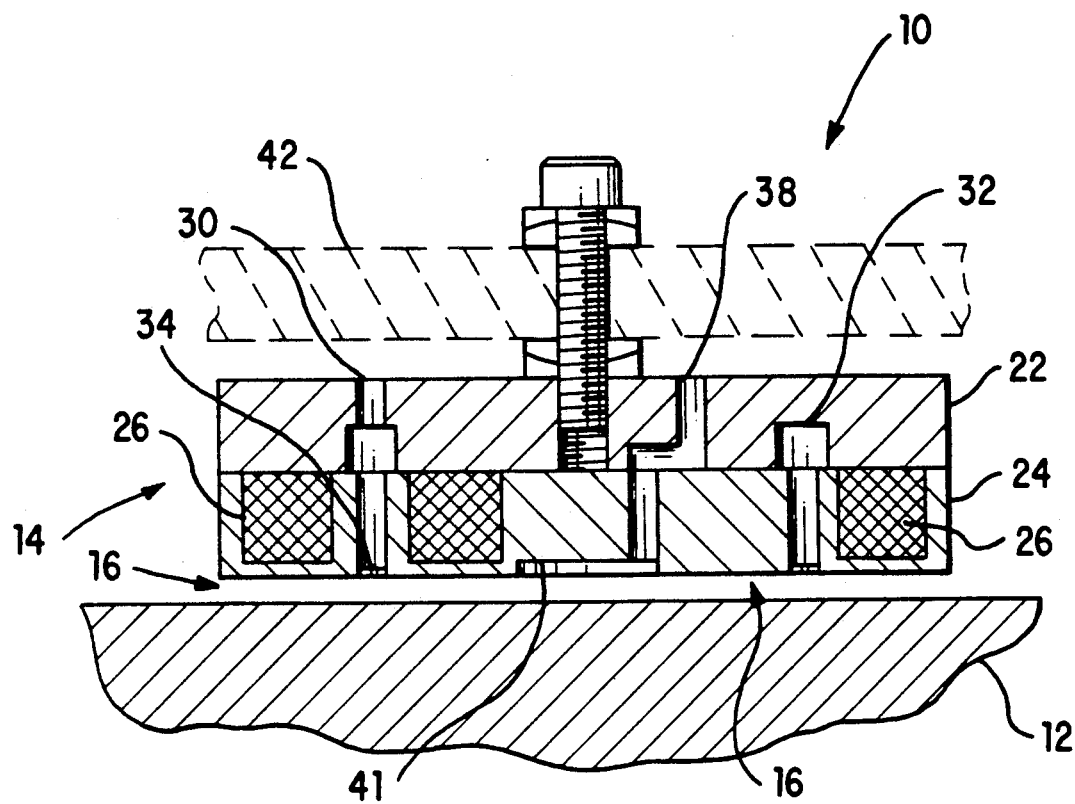
FIG. 3 is a section 3—3 view of FIG. 2.

In a preferred embodiment, as shown in FIGS. 2 and 3, which are elevated and cross-sectional view, respectively, of the same, the fluid channel 20 preferably includes an input port 30 disposed in the backing plate 22 in fluidic communication with the fluid supply means.

The channel 20 also includes a distribution manifold 32, preferably in the shape of an annulus, disposed in the backing plate 22 in fluidic communication with the input port 30. The channel 20 can also include a plurality of output ports 34 disposed and extending through the centerplate 24 in fluidic communication with the manifold 32 and the gap 16. As shown in FIGS. 2 and 3, there are 12 outputs ports 34. The element 14 preferably includes an exhaust channel 38 that extends through the centerplate 24 and backplate 22 which vents fluid from gap 16. Preferably, the fluid is air. The design of the flowing means in general is described in MTI handbook, Volume 1, Design of Gas Bearings.

The bearing system 10 preferably includes 18 magnets 26 which are disposed in two concentric rings in centerplate 24. Preferably, the centerplate 24 is comprised of aluminum and the backplate 22 is comprised of carbon steel, to enable the formation of the flux circuit 18 within the bearing system 10. The base 12 is preferably comprised of carbon steel.

In a further preferred embodiment, the element 14 is constructed as a circular disc having an outer diameter of 4 inches. Preferably, the total thickness of the element is approximately 1 inch; 0.5 inches of which is the centerplate 24 and 0.5 inches of which is the backplate 22. The magnets 26 are of a type Ne-Fe-B and are preferably recessed from the surface of the centerplate 24 facing the base 12 by 0.06 inches. If the Ne-Fe-B magnets 26 are impeded flush with the surface of the centerplate 24, the negative stiffness created by the closed flux circuit offsets the positive stiffness of the separation force created by the fluid, and the net stiffness of the bearing 10 is greatly reduced.

In the operation of the preferred embodiment, the element 14 is placed upon the base 12. Air is supplied through the input port 30 and is distributed by the manifold 32 into the 12 output ports 34. The air exits the output ports and forms a film of air which creates a separation force causing the element to float on the base 12. The slot 41 in the centerplate 24 results in a lower pressure region in the gap 16 relative to the remainder of the gap 16. This causes the exhaust air to be drawn from the output ports 34 toward the exhaust channel 38 where it is vented away, as well as from the outer diameter of the gap 16. A secondary device 42, such as a positioning platform, can be attached to the element 14 to support the device above base 12 and move it to a desired location above the base 12. The magnets 26 disposed within the centerplate 24 form closed flux circuits 18 which create a preload force which pulls the element 14 towards the base. As the element 14 then hovers above the base 12, it is under the influence of the preload force resulting from the magnets 26, the separation force of the flowing air, and any external forces such as gravity. The height of the gap 16 is thus determined when the preload force, the separation force, and external forces are in equilibrium.

Figure 4:
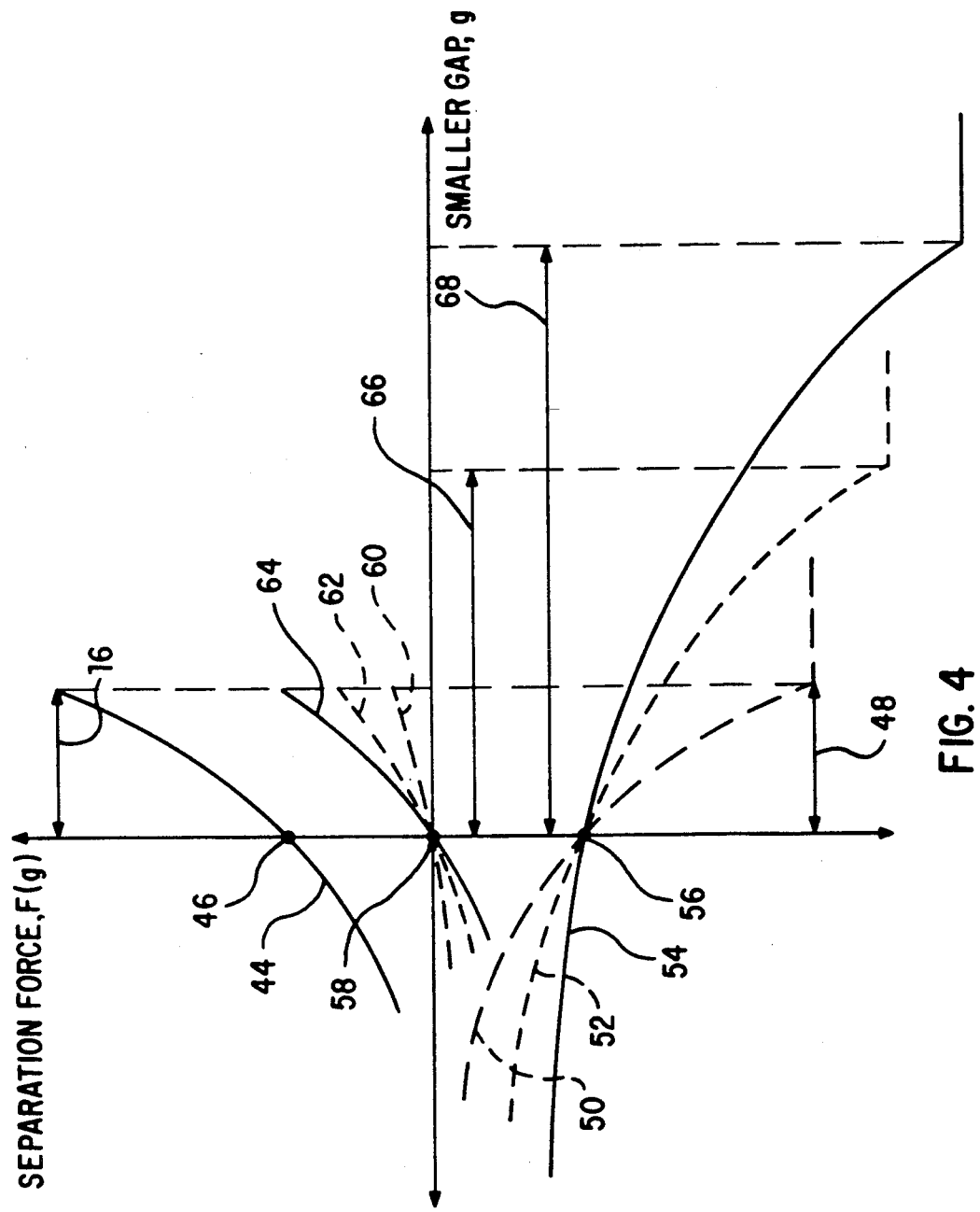
FIG. 4 is a graph of the preload and separation forces with respect to gap distance.

FIG. 4 is a graph showing the magnitudes of the preload and separation forces at varying gap distances. The fluid film separation force curve 44 produces force 46 at gap 16. The positive stiffness of the fluid film is the first derivative of curve 44 and is graphically represented as the slope of this curve.

The magnetic attraction preload curves 50, 52, 54 represent three cases, out of an infinite number of possible cases, in which the positive force 46 is offset by the negative force 56 and the net force 58 is zero. The magnetic attraction curves 50, 52, 54 have the general mathematical form:

$$F(g) = C1/(1 + C2g)^2$$

Where the first derivative is:

$$dF(g)/dg = -2C1\ C2/(1 + C2g)^3$$

and C1 and C2 are functions of the magnetic field source (permanent magnets or electromagnets) and other geometric and material properties. As with curve 44, the first derivative of curves 50, 52, 54 is graphically represented by the curve's slope.

Each of the preload curves 50, 52 and 54 have a total gap 48, 66, and 68, respectively, and produce a resulting force curve 60, 62, and 64, respectively, for bearing 10, when summed with fluid film curve 44. Curves 60, 62 and 64 all intersect 58, however, it is clear that curve 64 is the preferred case, for bearing 10, because it has the largest positive slope, and, therefore, the largest positive stiffness. Curve 64 also corresponds to the largest magnetic gap 68. This result is true in general because $dF(g)/dg$ decreases at a faster rate than $F(g)$ as the gap gets bigger. The critical feature demonstrated in FIG. 4 is that for a given fluid film force 46 and curve 44 the magnetic preload gap 68 must be larger than the fluid gap 16 to optimize the resulting stiffness of curve 64.

Simply stated, the fluid force is positive and has positive stiffness such that the force gets bigger as the gap gets smaller. The magnetic force is negative and has negative stiffness such that the force gets smaller (larger negative value) as the gap gets smaller. This invention combines these two forces such that the positive and negative forces sum to zero and the positive and negative stiffnesses sum to a large positive value. A large positive stiffness is achieved by minimizing the negative stiffness of the magnetic force which is achieved by making the magnetic gap large.

The magnetic preload gap is constained in practice, however, by the strength of the magnetic field source. Powerful magnetic field sources such as rare earth Ne-Fe-B magnets have recently become commercially available and greatly facilitate the implementation of this invention.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A bearing system comprising:
   a base made of a magnetic material;
   an element disposed adjacent the base, said element comprised of means for creating a separation force with a positive stiffness between the element and the base such that a gap is formed therebetween, and means for generating magnetic flux such that a closed magnetic flux circuit is formed through the element, the base and the gap creating a preload force with a negative stiffness between the element and the base, said positive stiffness greater than said negative stiffness, and said preload force essentially balancing said separation force.

2. A bearing system as described in claim 1 wherein said creating means includes means for flowing fluid through the element such that a fluid pressure is formed between the element and the base resulting in the presence of the separation force and the positive stiffness.

3. A bearing system as described in claim 2 including a fluid supply means, and wherein the flowing means includes at least one fluid channel extending through the element and fluidically connected to the supply means.

4. A bearing system as described in claim 3 wherein the element includes a backplate made of a magnetic material and a centerplate made of a nonmagnetic material in contact with the backplate such that the centerplate is between the backplate and the base, said channel extending through the centerplate and backplate; and wherein the generating means includes magnets with an equal number of north and south poles of equivalent size and field strength, the magnets disposed in the centerplate such that the polarity of adjacent magnets in the centerplate alternates so the closed flux circuit is formed through the adjacent magnets, the backplate, the gap and the base.

5. A bearing system as described in claim 4 wherein the magnets are offset from the surface of the centerplate in contact with the gap.

6. A bearing system as described in claim 5 wherein the magnets are permanent magnets.

7. A bearing system as described in claim 6 wherein one north and one south pole are adjacent to the gap.

8. A bearing system as described in claim 6 wherein the fluid channel includes an input port disposed in the backing plate and in fluidic communication with the supply means, a distribution manifold disposed in the backing plate and in fluidic communication with the input port, and a plurality of output ports disposed in and extending through the centerplate and in fluidic communication with the manifold and the gap.

9. A bearing system as described in claim 8 wherein the manifold is in the shape of an annulus.

10. A bearing system as described in claim 9 wherein the element includes at least one exhaust channel that extends through the centerplate and backplate which vents fluid out of the gap.

11. A bearing system as described in claim 10 wherein the fluid is air.

12. A bearing system as described in claim 11 wherein 18 permanent magnets are aligned such that 9 north and 9 south poles are adjacent to the gap and there are 12 output ports.

13. A bearing system as described in claim 12 wherein the magnets are rare earth magnets.

14. A bearing system as described in claim 13 wherein the magnets are made of Nd-Fe-B.

* * * * *